United States Patent Office 3,072,302
Patented Jan. 8, 1963

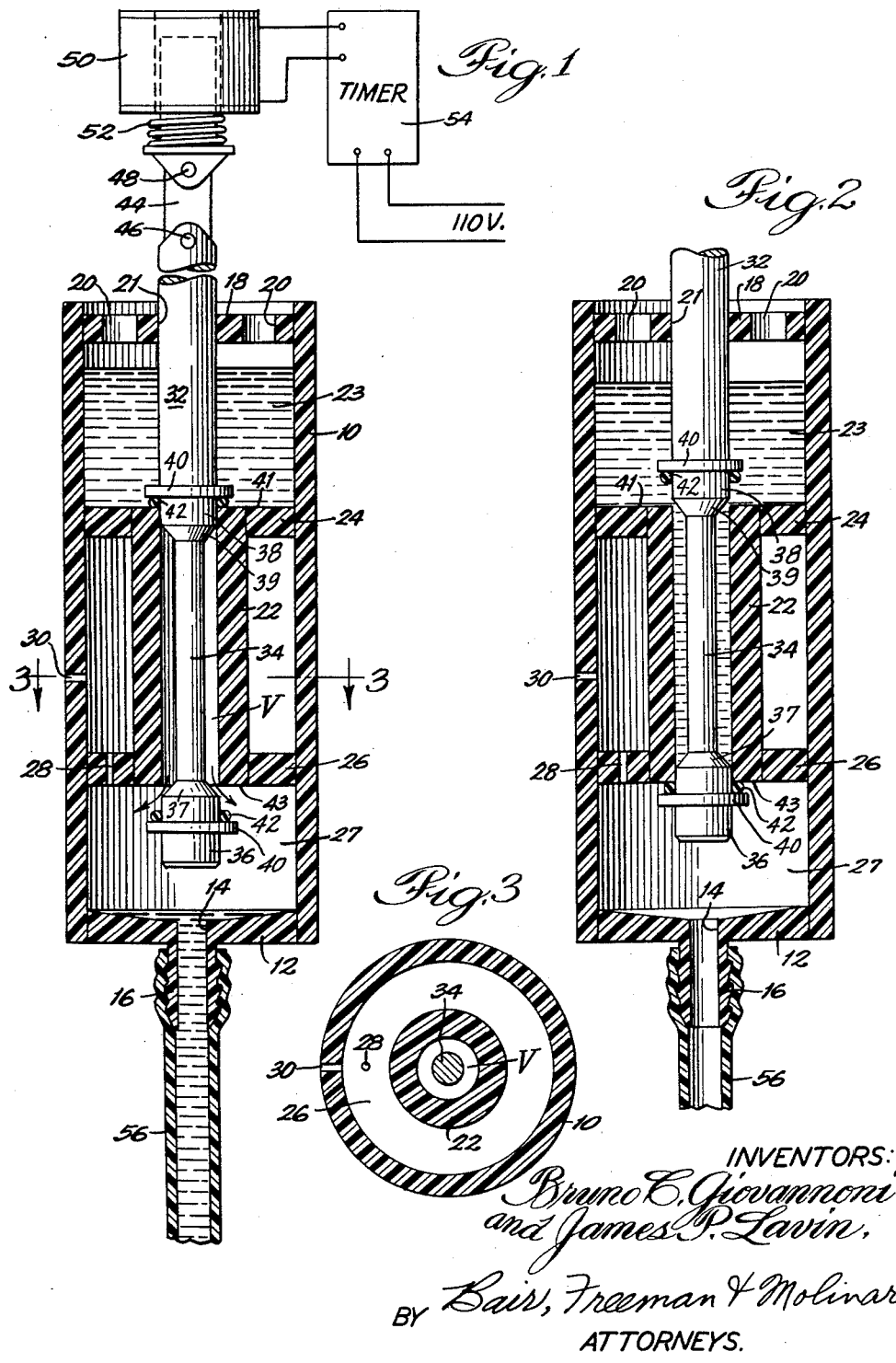

3,072,302
DISPENSING DEVICE
Bruno C. Giovannoni, 4060 N. Meade, Chicago 31, Ill., and James P. Lavin, 5016 Lee St., Skokie, Ill.
Filed June 27, 1960, Ser. No. 38,821
4 Claims. (Cl. 222—442)

This invention relates to an apparatus for dispensing an accurate volume of liquid at regular intervals. It finds particular use in dispensing slugs of liquid into a container for maintaining the concentration of said liquid in a solution within the container. For example, in preparing photoengravings by etching, a solution of ferric chloride is commonly used. It is necessary, however, to add to the ferric chloride a solution which prevents the ferric chloride from undercutting the protected areas of the plate. This solution is dissipated as the etching process progresses. In order to produce top quality engravings at all times it is essential that the additive be replenished as it is used. This must be done more or less constantly during the entire etching process and obviously the amount of liquid additive added must be proportional to the amount that is consumed.

It is, therefore, an object of this invention to provide an apparatus which dispenses liquid at periodic intervals in accurate predetermined volumes.

Another object is to provide an apparatus of this kind which is adjustable so that the liquid may be dispensed in slugs of accurate volume at a faster or a slower rate.

Another object is to provide an apparatus which is simple in construction, inexpensive to manufacture and reliable in operation.

In a preferred form of the invention we have provided a hollow cylinder or tube defining a chamber of accurately predetermined volume and a pair of piston-like valve members mounted on a shaft axially disposed within the cylinder. The valve members are spaced from each other a distance lesser than the length of the cylinder. As the shaft is reciprocated within the cylinder in one direction, the piston valve which is opening does not break contact with the wall of the cylinder until the opposite end is closed, and vice versa. By providing a reservoir for supplying liquid to the cylinder and a receiver for catching liquid flowing out of the cylinder, it is possible to dispense accurate quantities of liquid equal in volume to the volume of the cylinder (less the space occupied by the shaft). In our construction great accuracy is achieved because only the predetermined volume of liquid in the cylinder is dispensed. This results from closing the end of the cylinder connecting with the reservoir before the liquid is released from the cylinder. A solenoid is preferably connected to the end of the shaft and is coupled with an electric timer to control the frequency at which the shaft is reciprocated. These and other objects of the invention will be apparent from the following description when read in connection with the accompanying drawings, wherein:

FIGURE 1 is a side view of the apparatus of the invention with the dispensing portion shown in cross section;

FIGURE 2 is a cross-sectional view of the dispenser of FIGURE 1 showing the valve rod at the opposite end of its stroke; and FIGURE 3 is a sectional view taken along the line 3—3 of FIGURE 1.

Referring to the drawing, the dispenser of the invention comprises a housing 10 which is preferably cylindrical in shape and has a bottom 12 and a top 18. The bottom 12 contains an opening 14 to which nipple 16 is connected for attaching a flexible tube 56. The top 18 has a central opening 21 which serves as a bearing for the shaft 32, as explained hereinafter, and also contains a plurality of openings 20.

A cylinder 22 defining a chamber having an accurate predetermined volume is axially disposed within the housing 10 between the bottom 12 and the top 18. Cylinder 22 is secured to the inner wall of the housing 10 by means of annular bulkheads 24 and 26 mounted at either end of the cylinder. The bulkheads 24 and 26 cooperate with the housing 10 to form compartments or enclosures 23 and 27 above and below the cylinder 22.

A shaft 32 is axially disposed within the cylinder 22 and is of lesser diameter near the lower end to form the rod portion 34. Above and below the terminus of the small diameter rod 34 we have placed O-rings 42 which abut against collars or flanges 40 to effect a seal against the end surfaces 41, 43 of the cylinder 22. The collars serve as stops to arrest the reciprocative movement of the rod and are cemented to the shaft or machined from the same piece of stock. The portion of the shaft adjacent each end of the small diameter rod 34 constitutes piston-like valve members 36 and 38, which regulate flow through cylinder 22. These valve members are exactly the same diameter as the shaft 32 and fit rather snugly within the cylinder 22 so that they seal the cylinder upon engagement with the side wall thereof. Although the mating of these parts is sufficient to shut off fluid flow through the cylinder 22, it is desirable to add the O-ring beneath the stop collar to compensate for any looseness or play which may develop after the apparatus has been in use for some time.

It will be noted that the valve members 36 and 38 are spaced from each other a distance lesser than the length of the cylinder 22. Thus, the top piston-like valve member 38 engages the side wall of cylinder 22 before the bottom valve member 36 separates therefrom. Fluid within the annular space, designated "V" in the drawing, then may flow downwardly into the enclosure 27, but not before the top valve 38 is closed. Hence only the precise quantity of fluid in the space V is dispensed. Likewise, after the bottom valve member 36 is engaged with the wall of the cylinder 22, the top valve member 38 is opened so that the space V is in communication with the enclosure 23. This is best shown in FIGURE 2. The valve members are tapered as indicated at 37, 39 to facilitate liquid flow around them.

The upper end of the shaft 32 is connected to the core of a solenoid 50 by means of a link 44 and cooperating pins 46, 48. A spring 52 biases the solenoid downwardly so that the valve member 36 is opened and the valve member 38 is closed when the solenoid is not energized. A timer 54 is interposed between the solenoid and the source of power to switch the power on and off at predetermined intervals. This timer is of the standard type but has been modified to include a thermostatic delay relay so that it will automatically reset. If it is determined that the solenoid is to dump a slug of liquid having a volume V from the cylinder 22 every 90 seconds, the timer is set for 90 seconds. Upon expiration of this period the solenoid is energized as the switch in the timer is closed. During the time the solenoid is energized, the space V fills completely with liquid from the reservoir 23. Within a few seconds, the timer resets itself for a second 90 second period, whereupon the solenoid is de-energized and the liquid is dumped into the receiver or enclosure 27. The cycle is then repeated.

Preferably, the liquid-contacting parts of the apparatus are made from plastic which is resistant to the action of the additive solution. Acidic solutions like those used in etching will attack metals unless they are coated with an acid resistant coating such as polyvinyl chloride. Although coated metal is operable, we have found that a plastic such as polymethyl methacrylate is preferred in resisting ferric chloride solution. The O-rings 42 are made from rubber or synthetic rubber and the tube 56 is made from flexible plastic or rubber. If the liquid is not corrosive, the materials are not critical. The plastic may be obtained in standard-sized tubes and the discs forming the ends 12 and 18 and the annular bulkheads 24 and 26 may be machined from standard sheet stock. Likewise, the rod or shaft 32 is standard and it is machined as indicated at 34 to the proper diameter to provide the desired volume in the annular space V. It will be understood that the apparatus may be designed to handle any predetermined volume of liquid by calculating the dimensions of the inside diameter of the cylinder 22, the distance between the piston-like valve members 36, 38, and the diameter of the rod 34 to produce the desired volume in annular space V. Every time shaft 32 drops, the precise volume of liquid desired will be discharged into the enclosure 27. Collars 40 are spaced apart a distance sufficient to permit the valves to open to the point where the end of rod 34 is even with the end of cylinder 22. This provides the greatest annular space for the flow of liquid therethrough.

It is believed that the operation of this device is apparent from the foregoing description. A supply of liquid which is to be dispensed is poured into the reservoir compartment 23 through the openings 20 in the top disc 18. In starting position the valve member 36 is open and the valve member 38 is closed so that the space V is empty. During this time, of course, the solenoid is de-energized. Upon the expiration of the time for which the timer has been set, the switch in the timer closes to energize the solenoid. The shaft 32 is lifted by the core thus closing the valve 36 and opening the valve 38 in that order. The space V is filled immediately from the reservoir compartment 23 within the two second delay period provided by the relay. At the end of this period the timer is reset and the shaft 32 drops to close valve 38, open valve 36 and release the measured quantity of liquid. The liquid discharged flows into the receiver enclosure 27, through the opening 14 in the bottom 12, through the nipple 16, and into the flexible tube 56 to the container in which it will be used. Other timing devices may be used. For example, the switch may be closed (and the solenoid energized) except when resetting occurs.

It will be appreciated, of course, that the receiver enclosure 27 must be vented in order to permit the fluid to flow into the tube. In the particular form of the device shown in the drawing the enclosure 27 is vented by means of a small opening 28 extending through the bulkhead 26 and a second opening 30 which communicates with the atmosphere through the wall of the housing. Using dual openings in this fashion prevents loss of any of the critical amount of liquid which is discharged from the annular space V into the enclosure 27. Thus all of the liquid flows into the delivery tube 56.

From the foregoing description it is apparent that the apparatus of the invention is very simple in construction and economical to build. It will function satisfactorily over long periods of time without failing to dispense precisely the desired volume of liquid as controlled by the volume of the annular space V.

We have found that by utilizing in conjunction with this apparatus a chart or graph which sets forth the frequency at which the specified volume of liquid is to be dispensed against the number of square inches to be etched, the operator, without any calculations on his part, can very accurately control the amount of additive incorporated in an etching solution. Thus when confronted with the problem of etching an engraving having 125 square inches of area to be etched, the operator merely picks the frequency corresponding to this area from the chart, and sets the timer at that figure. If he finds that the frequency is two minutes, he sets the timer at two minutes and need have no further concern about the operability of the device. It will proceed to dispense the predetermined volume of ½ ounce, 1 ounce, or whatever the volume V has been designed for, every two minutes. Of course, the illustration given here is concerned with the dispensing of additives to an etching solution but the invention is equally suitable for any use in which it is desired to dispense liquid at a predetermined rate.

Other modifications in the construction of this device and the materials used will be apparent to those skilled in the art. It is our intention to include within the scope of the appended claims all such modifications which are embraced by the language thereof.

This application is a continuation-in-part of our copending application Serial No. 823,728, filed June 29, 1959, now abandoned.

What we claim as new and desire to secure by Letters Patent of the United States is:

1. A liquid dispensing apparatus for dispensing predetermined quantities of liquid at regular intervals comprising a hollow cylinder having open ends defining a chamber of predetermined volume, a piston-like valve member mounted at each of said open ends, said valve members facing one another so as to cooperate with the open ends of the hollow cylinder, shaft means interconnecting said valve members and spacing them at a distance less than the length of said hollow cylinder, means adjacent said hollow cylinder for regularly actuating said shaft means in two directions to close one valve and open the other in that order as the shaft means move in one direction and to open said one valve and close said other valve in that order as the shaft means moves in the other direction, housing means enclosing said hollow cylinder, valve members, and shaft means, said housing means defining a supply reservoir for supplying liquid to one end of the chamber and a discharge receiver for liquid discharged from the other end of the chamber, discharge means operatively communicating with the discharge receiver for discharging liquid from the discharge receiver, and vent means in the housing means above the discharge receiver communicating the discharge chamber with the atmosphere, said vent means being constructed and arranged to prevent loss of any of the predetermined quantity of liquid discharged from the hollow cylinder into the discharge receiver.

2. The apparatus of claim 1 wherein each said valve member includes an O-ring sealing member which rests on the end of the wall of said cylinder when the valve is closed, and a stationary collar to arrest movement of the valve member after it has engaged the wall of the cylinder.

3. The dispensing apparatus of claim 1 wherein said valve members facing toward one another are tapered where they join said shaft means to facilitate fluid flow around the valve members.

4. A liquid dispensing apparatus for dispensing liquid at regular intervals in accurate predetermined quantities comprising an elongated housing having an opening in the top and an opening in the bottom thereof, a tube of predetermined volume mounted axially of said housing between said top and bottom, upper and lower annular bulkheads extending between the ends of said tube and the elongated housing to form an enclosure above and below the tube and to secure the tube to the wall of said housing, a shaft extending through said opening in the top of said elongated housing and through the tube and mounted for axial movement therein, a pair of piston-like valve members mounted in spaced relation on said shaft and adapted to slide in said tube for alternately closing the ends of said tube, one of said pair of valve members closing one end of said tube before the other end is opened by the other valve member, thus regulating the flow of fluid through said tube from one of said enclosures to the other, the volume of the space within the tube excluding the volume of the shaft being no greater than the volume of the enclosure below the tube, a solenoid connected to said shaft, timer means for controlling the energization of said solenoid at regular intervals to reciprocate said shaft at regular intervals whereby the space within said tube is alternately in communication with said enclosure above the tube and said enclosure below the tube, discharge means connected to said elongated housing in communication with said opening in the bottom thereof, and vent means in the lower annular bulkhead and in the elongated housing for communicating the enclosure below the tube with the atmosphere and being constructed and arranged to prevent loss of any of the predetermined quantity of liquid flowing into the enclosure below the tube from within the tube.

References Cited in the file of this patent

UNITED STATES PATENTS

| | | |
|---|---|---|
| Re. 23,830 | Mojonnier | May 18, 1954 |
| 785,094 | Fribourg | Mar. 21, 1905 |
| 793,154 | Phillips et al. | June 27, 1905 |
| 1,064,150 | McDaniel et al. | June 10, 1913 |
| 1,585,025 | Gorschalki et al. | May 18, 1926 |
| 2,248,958 | Christensen et al. | July 15, 1941 |
| 2,959,341 | Noakes | Nov. 8, 1960 |

FOREIGN PATENTS

| | | |
|---|---|---|
| 567,957 | Great Britain | Mar. 9, 1945 |